United States Patent
Schulz et al.

[19]

[11] Patent Number: 6,047,996
[45] Date of Patent: Apr. 11, 2000

[54] SELF-CENTERING LOW PROFILE CONNECTION

[75] Inventors: Gary A. Schulz, Arlington Heights; Jeffrey E. Burgard, Lombard, both of Ill.

[73] Assignee: UOP LLC, Des Plaines, Ill.

[21] Appl. No.: 08/999,876

[22] Filed: Nov. 11, 1997

[51] Int. Cl.[7] ..................................... F16L 21/06
[52] U.S. Cl. .................. 285/331; 285/363; 285/373; 285/421
[58] Field of Search ................. 285/39, 90, 336, 285/363, 373, 421, 419, 382.2, 382, 331

[56] References Cited

U.S. PATENT DOCUMENTS

| | | | |
|---|---|---|---|
| 3,472,538 | 10/1969 | Vincent et al. | 285/421 |
| 4,159,132 | 6/1979 | Hitz | 285/39 |
| 4,407,533 | 10/1983 | Giebeler | 285/373 |
| 4,460,201 | 7/1984 | McGugan | 285/373 |
| 4,684,156 | 8/1987 | Rhodes | 285/421 |
| 4,812,285 | 3/1989 | Stapleton | 285/421 |
| 5,076,617 | 12/1991 | Bronnert | 285/351 |
| 5,098,134 | 3/1992 | Monckton | 285/421 |
| 5,131,632 | 7/1992 | Olson | 285/382 |
| 5,152,556 | 10/1992 | Holland et al. | 285/353 |
| 5,265,917 | 11/1993 | Hitz | 285/86 |
| 5,582,440 | 12/1996 | Pascaru | 285/373 |

FOREIGN PATENT DOCUMENTS

| | | | |
|---|---|---|---|
| 1210425 | 9/1960 | France | 285/421 |
| 1088003 | 9/1960 | Germany | 285/421 |
| 2005949 | 1/1994 | Russian Federation | 285/421 |
| 17432 | 2/1912 | United Kingdom | 285/421 |

*Primary Examiner*—Eric K. Nicholson
*Attorney, Agent, or Firm*—Thomas K. McBride; John G. Tolomei

[57] ABSTRACT

The assembly of a connection that uses cooperating grooved surfaces to provide an easily disassembled and assembled connection is improved by the use of a centering surface and cooperating lip that engages the faces of the connection end to prevent lateral misalignment while the pipe ends are brought together for axial alignment. The centering device may be used with a clamping mechanism to provide single person assembly of this type of connection despite normal field misalignments. The centering surface in the face of the connection ends may use any type of gasketing surface to provide the desired amount of seal strength.

7 Claims, 3 Drawing Sheets

SELF-CENTERING LOW PROFILE CONNECTION

BACKGROUND OF THE INVENTION

This invention relates generally to the connection of conduits with connectors that are readily coupled and uncoupled in conduit systems.

BACKGROUND OF THE INVENTION

Connectors for conduits such as piping systems where the pipes are not suitable for use with screwed connections are well known. One of the most common forms of such connection is the well known flange connection having bolts for assembly and disassembly of the connection. Another well known type of connection uses a series of machined grooves on the ends of pipes that are connected by bridging links that have complementary grooves for engaging the grooves on the pipe ends. A sleeve or other retaining means is used to hold the link members against the pipes and the cooperating grooves in engagement. Different forms of these types of connections can be seen in U.S. Pat. Nos. 5,152,556; 5,265,917; 5,131,632 and 4,159,132.

Alignment of bolted flanges has been provided in a number of ways. The most basic way to align bolted flanges is by the use of the bolts and the tightening sequence to simultaneously draw the flange halves together and align the centerlines of both flanges.

One difficulty in groove and link type connections has been in their field assembly. The ends of pipes to be connected often extend from equipment and or piping arrangement that do not provide perfect alignment for engagement of the links in the grooves of the pipe ends. In the assembly of these connections, the pipe ends must be perfectly aligned in the radial or the axial direction for the retaining links to be applied to the outside of the pipe ends. The ends must be maintained in perfect alignment and the links held in place while an attachment sleeve is slid over the links to retain them in place. The assembly of these groove type connections can create problems in field assembly due to the difficulty of maintaining the alignment of the center line of the connection ends while the linking members are put in place and the annular ring or other retaining device secures the locking of the linking members in place. The problem is exacerbated due to the fact that the faces of both connection ends are perfectly smooth for most commonly used gasket styles. This allows them to easily slide out of alignment relative to each other with little or no external force supplied. This leads to a difficult and inefficient assembly that requires one or two persons to manually maintain the alignment of the pipe ends while another person attaches the link members and the tapered ring that holds them in place.

Previously mentioned U.S. Pat. No. 4,159,132 issued to G. L. Hitz teaches the use of a clamping method to draw both halves of the pipe ends into place about their contact faces. The clamping mechanism however does not provide the necessary lateral alignment and stability for the two halves during assembly of the links and locking of the retaining means on the links.

SUMMARY OF THE INVENTION

An object of this invention is to facilitate the installation of grooved and link-type connections.

This invention is the addition of an integral self-aligning structure on the pipe connection. The integral self-centering structure can consist of a lip or raised surface on the connection end of one conduit that cooperates with a complementary centering surface on the end of the mating conduit. The lip and centering surface can have many different forms including ramped or square lips that cooperate with a flat or ramped centering surface. The lip and centering surface can be located to the outside, inside or in the middle of the connector faces. The remainder of the connector face can be arranged to provide a sealing surface or a direct contact seal for retaining a gasket to provide a gasketed seal.

The connection provided by the invention can be practiced with or without the use of a clamping means. The conduit ends are brought into alignment until the lip and the mating surfaces cooperate to prevent radial misalignment of the conduit ends. The lip and centering surface will then maintain the radial alignment of the two ends once the conduit ends are brought together and aligned axially. The only force that may be necessary to be applied to the conduits will maintain the axial alignment of the conduits so that the two ends remain in close proximity and the lip and centering surface remain engaged. An additional clamping means may be provided to provide any necessary force to keep the connector faces of the conduit ends sufficiently close together such that the lip and centering surface remain engaged during placement of the links and addition of the retaining means. Thus, as long as axial alignment is maintained there is no need to apply any force to maintain lateral or radial alignment of the ends. Accordingly, the link members will not be displaced from engagement with the grooves on either conduit end before the retaining sleeve can be placed over the links.

The use of a square or ramped surfaces for the lip or contact surface will depend on the particular application of the connector. The use of an angled lip and/or centering surface has the advantage of bringing the pipe ends into lateral alignment as the pipe ends are brought axially together.

Accordingly, in a specific embodiment this invention is a connection for joining conduits in a piping arrangement. The connection has a first connection half that defines an external contact surface extending at least intermittently around the periphery of the connection half in a transverse direction and a first connector face at one end of the first connection half. The external contact surface faces away from the connector face and extends from the outer surface of the connector half at an angle of at least 90° with respect to the axis of the connection to define a perpendicular or a ramped surface. A lip is located about and extends at least intermittently around the first connector face. A second connection half having essentially the same configuration as the first connection half except for the connector face is also used in the connection. The other connector half has a centering surface located about and extending at least intermittently around the second connector face to engage the lip as the connector faces are brought together. At least two links are adapted to each extend partially around the outside of the connection halves about the central axis of the connection. Each link has a pair of longitudinally spaced apart contact surfaces that extend at least partially around the interior of each link in a transverse direction. Contact surfaces of the links engage the external contact surfaces on the connection halves. A locking member extends at least partially around and in engagement with the links to secure the spaced apart contact surfaces of the links into engagement with the external contact surfaces of the connection halves.

Other objects, embodiments and details of this invention can be more fully understood from the following detailed description of the drawings.

DETAILED DESCRIPTION OF THE DRAWINGS

Figure 1:
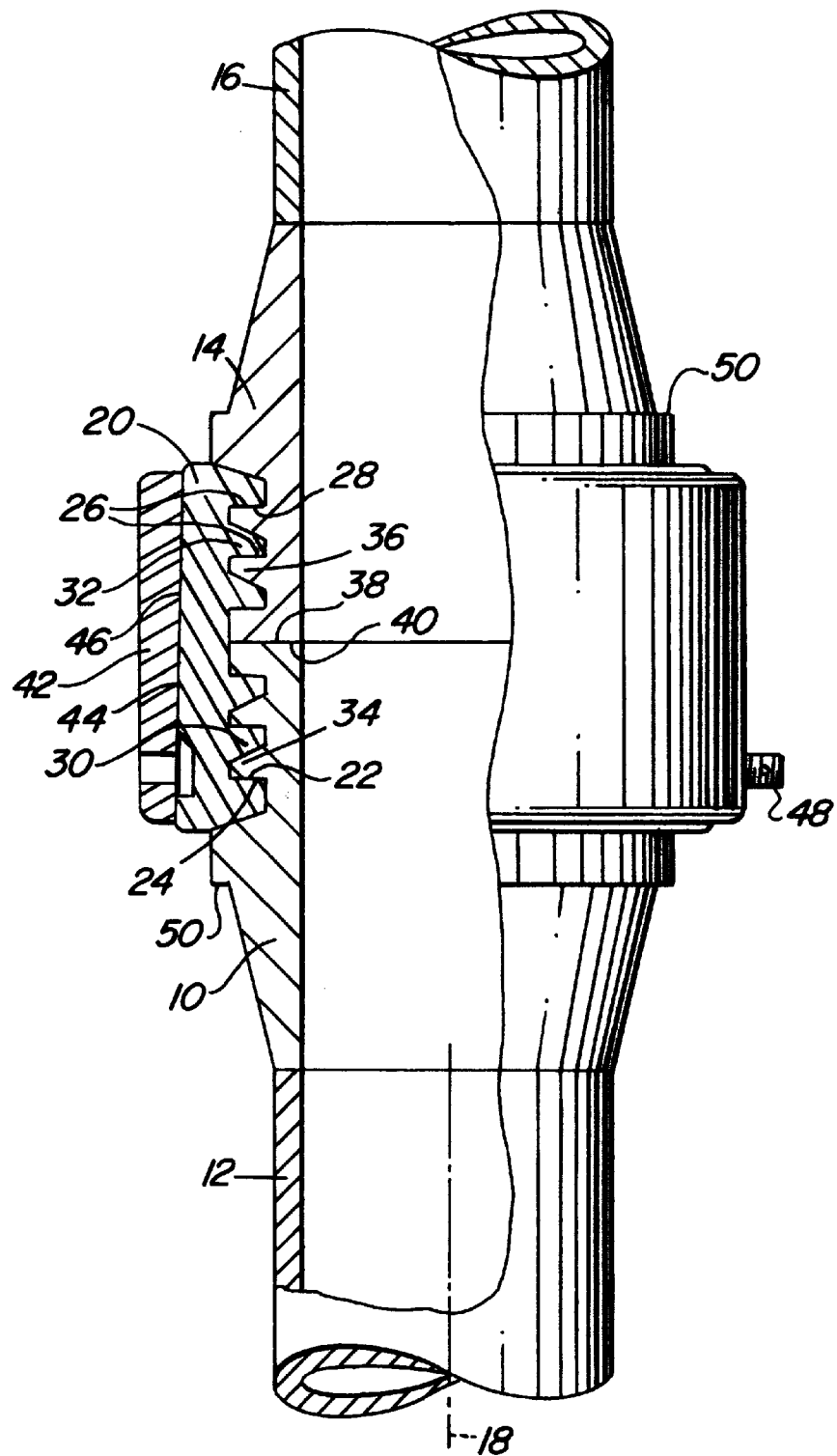
FIG. 1 is a partial section of the connector arrangement of this invention.

FIG. 1 shows the connection of this invention having a connection half 10 joined to a pipe end 12 and a connection half 14 joined to a pipe end 16. Connection halves 10 and 14 will usually have a cylindrical shape and be located at the end of pipes, in pressure vessels or on blind flange members. Pipe sections 10 and 12 are located about a common axis 18. Each connection half 10, 14 also defines a shoulder 50 for engagement with a suitable device, such as a clamp, to provide an axial force and aligning movement to the connection halves during assembly.

At least two semi-cylindrical links 20 having contact surfaces 24 and 26 engage contact surfaces 22 and 28 on connector halves 10 and 14, respectively. A series of grooves defined by transversely extended ribs 30 and 32 on link 20 define the contact surfaces 26 and 24 respectively. Similarly transversely extended ribs 34 and 36 on connector halves 10 and 14 define contact surfaces 22 and 28. Contact surfaces 22 and 24, and contact surfaces 26 and 28 may extend perpendicularly from the link or connector halves or may have a small taper to urge connector faces 38 and 40 toward teach other. Contact surface may extend all the way around pipe ends and over the entire transverse length of the link or may be formed as intermediate sections of contact surfaces over only a portion of the transverse length of the links and the connector halves.

Links 20 are held in place by an annular sleeve 42 that has a sloped surface 44 for engagement with a complementary sloped surface 46 on the outside of the links 20. A set screw 48 or other similar attachment device may be used to keep sleeve 42 in place over links 20. The types of retaining devices are not limited to structures such as sleeve 42. Any suitable retaining structure or mechanism could be used such as a clamp arrangement.

Figure 2A:
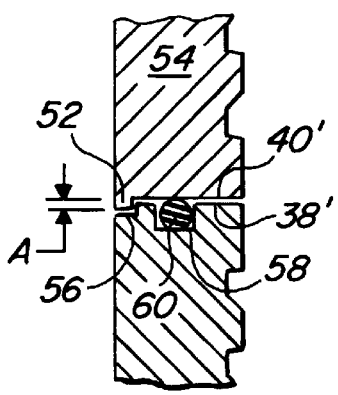
FIGS. 2A through 2E show a variety of lip and centering surface configurations useful for this invention.

Contact faces 40 and 38 will contain a lip structure. As shown in FIG. 2A, a square lip 52 extends outwardly from a contact face 40' of a connector end 54. The outward projection A of lip 52 will vary depending on the size of the connection. Typically projection A need not be large but should be sufficient to prevent slight separation between the connection halves from allowing the pipe ends to spring away from lateral alignment will normally be in a range of about 0.030" to 0.125". An opposing connector face 38' has an internal groove 56 formed at the inside of the connector half to receive lip 52.

Contactor face 38' also shows an optional groove 58 for retaining an O-ring gasket 60. Gasket 60 may be used for high pressure sealing. In other cases where conduits are used to conduct particle flows, establishing absolutely tight gas or liquid seals may not be a requirement of the connections.

The depth of groove 56 is ordinarily sized to minimize any gap between the outer face of lip 52 and the bottom of groove 56. Where a gasket such as O-ring 60 is used, connector faces 40 and 38 need not contact each other and the outer face of lip 52 may bottom out on the bottom of groove 56 to eliminate any interior gap along the sidewall.

Figure 2B:
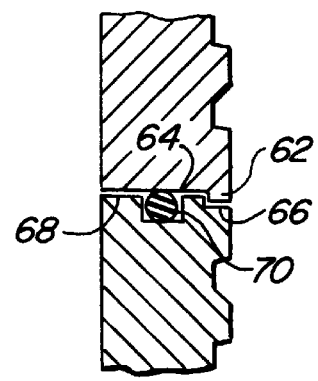

FIG. 2B shows an alternate arrangement for the connector faces at the end of the connection halves. In FIG. 2B a lip 62 extends from and encircles the outer diameter of connector face 64. Similarly a receiving groove 66 is located around the outer perimeter of connector face 68. A gasket and groove 70 are again located to the inside of lip 62 and the centering surface provided by groove 66.

The square lip arrangement shown in FIG. 2A and FIG. 2B have several advantages. They provide a compact design. In addition they establish excellent alignment with simple machining.

Figure 2C:
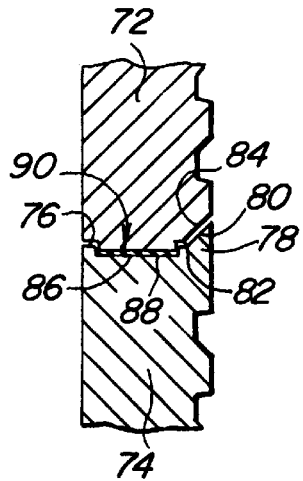

FIG. 2C is another alternate arrangement for connector faces at the ends of connection halves 72 and 74. Connector half 72 has a connector face 76 that defines a lip 78 having a ramp surface 80. Connector half 72 has a face 82 into which a centering surface 84 is formed. Connector surface 76 also defines a gasket groove 86 into which a step 90, formed on the connector surface 82, pushes a flat gasket 88.

Figure 2D:
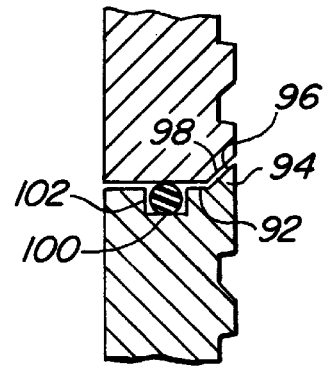

FIG. 2D shows an alternate gasket arrangement for a centering structure similar to that shown in FIG. 2C. A connector face 92 again has a lip 94 form around the outer perimeter thereof to present an angled surface 96 to a cooperating angled centering surface 98. FIG. 2D differs principally from that shown in FIG. 2C by the use of an O-ring gasket 100 in a suitable retaining groove 102.

Figure 2E:
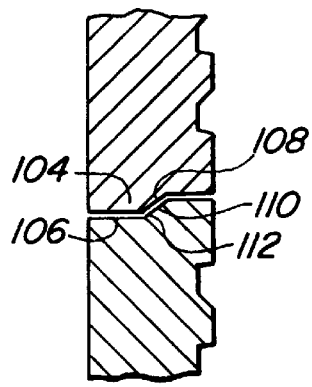

FIG. 2E shows the lip and centering surface of this invention used without a gasket. In this arrangement, an inner lip 104 extends around the inside from a connector face 106 to define an annually extended ramp surface 108 in the center of contact face 106. A centering surface 110 is defined in the center of a connector face 112 to provide centering as the connector faces 106 and 112 are brought into contact.

Figure 3:
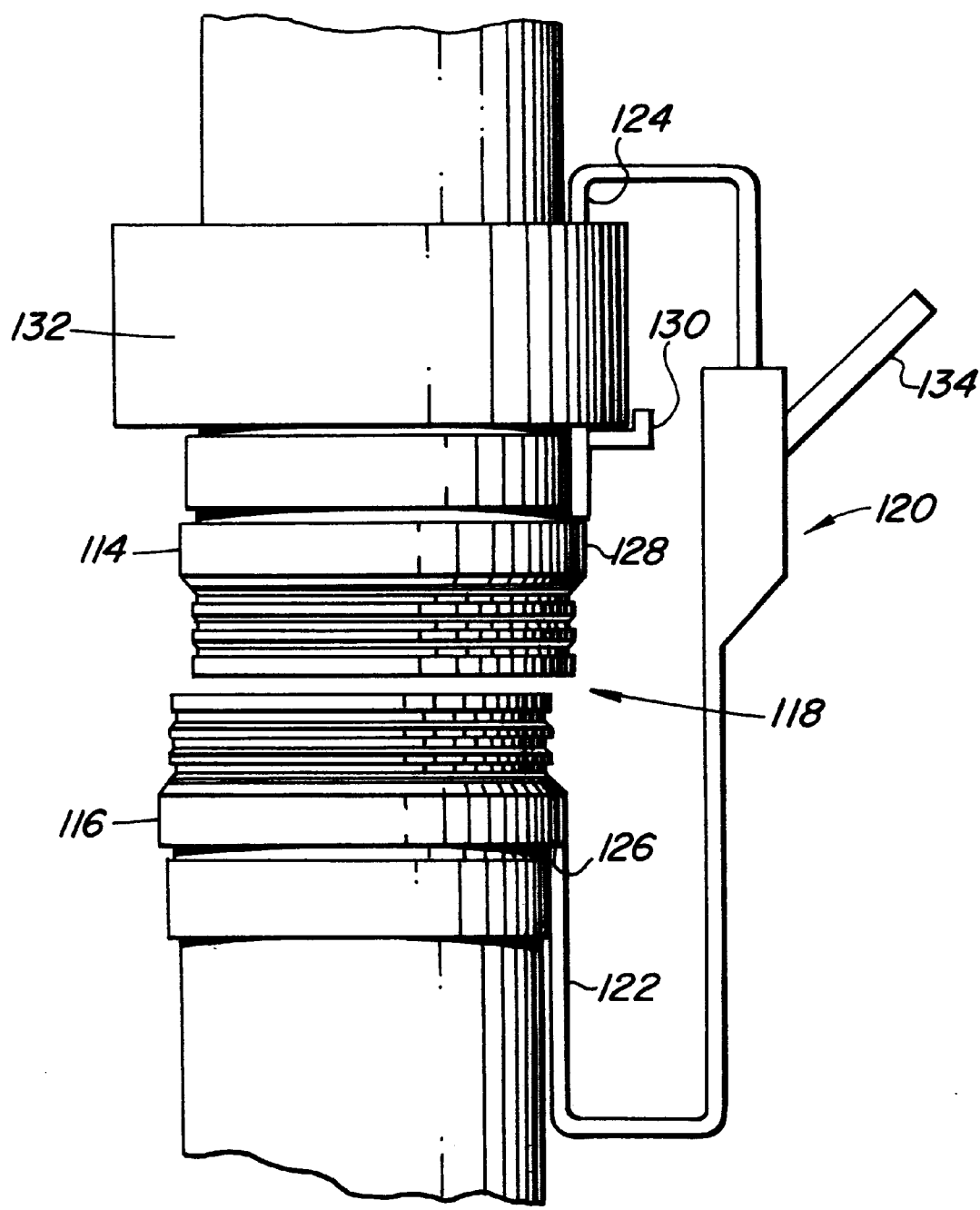
FIG. 3 shows a clamping arrangement for use with this invention.

FIG. 3 shows a suitable device for assembling two pipe ends by the method of this invention. By this method, pipe ends 114 and 116 will be provided generally at 118 with suitable portions of a lip and centering surface the same or similar to those shown in FIG. 2A through FIG. 2E. The procedure uses a clamping device 120. The clamping arrangement has extended legs 122 and 124 with ends that contact shoulders 126 and 128, respectively. Circumferential straps 123 and 125 may be provided to hold legs 123 and 126 in place during assembly. Either or both of arms 122 and 124 may be provided with a place for a retaining bracket 130 for holding annular sleeve 132 away from pipe ends 114 and 116 as the clamp is being used to align the pipe end. The extended length of links 122 and 124 provide enough space for the pipe sleeve to be positioned out of the way of the connection as the links of the connection (not shown) are being applied to the pipe ends.

The procedure begins by laterally aligning the pipe ends 114 and 116 while clamp 120 pulls pipe ends 114 and 116 together by closing the clamp through movement of lever 134. Once the pipe ends are brought into engagement with the centering device, continued movement on lever 134 may bring the ends of connector halves 114 and 116 together for installation of the connector links (not shown). Once connector halves 114 and 116 have been brought together and the lip and centering surfaces are engaged, no further lateral restraint of the pipe ends is necessary. Therefore, the link members may be installed across the connector halves without any concern of pipe spring laterally displacing the links before sleeve 132 may be brought into position for retaining the links. Once sleeve 132 has been positioned to hold the links in place, clamp 120 may be retracted and the assembly is complete.

What is claimed:

1. A pipe connection for joining pipe ends, said connection comprising:
   a first pipe end having a first transverse connector face at its distal end defining a first plurality of spaced apart grooves each defining flats encircling the outside of the pipe end;
   a second pipe end having a second transverse connector face at its distal end adapted for sealing engagement with said first transverse connector face and defining a second plurality of spaced apart grooves each defining flats encircling the outside of the second pipe end;
   a lip extending around said first transverse connector face;
   a centering surface extending around said second transverse connector face for aligning engagement with said lip as said first and second transverse connector faces are urged toward each other;
   at least two semi-cylindrical links adapted to together substantially encircle said first and second pipe ends, each link defining two longitudinally spaced apart groups of grooves each group of grooves defining flats for engaging the flats in one of said first and second plurality of grooves and each link having a ramped outer surface; and,
   an annular sleeve having an internal sloped surface for encircling said links and retaining said links in contact with said pipe ends.

2. The connection of claim 1 wherein said flats are ramped to urge said connector faces toward each other as said ring engages said links.

3. The connection of claim 2 wherein said links hold said first and second connector surfaces in sealing contact to provide a sealed connection.

4. The connection of claim 1 wherein one of said connector faces defines a groove for retaining a gasket and said links hold the other of said connector faces in sealing engagement with said gasket.

5. The connection of claim 1 wherein said lip is defined by a stepped surface on said first connector face and said centering surface defines a cooperating stepped surface.

6. The connection of claim 1 wherein said lip and said centering surfaces are defined by cooperating ramped surfaces.

7. The connection of claim 1 wherein said lip is on the outside of said connector face, the inner part of said connector faces form a sealing surface and said end of said lip is located to avoid contact with said second sealing face when said sealing surfaces are in sealed contact.

* * * * *